(12) United States Patent
Wachtel

(10) Patent No.: US 6,419,422 B1
(45) Date of Patent: Jul. 16, 2002

(54) UNDERGROUND IRRIGATION METHOD AND SYSTEM

(75) Inventor: Boaz Wachtel, Even Yehuda (IL)

(73) Assignee: International Water & Energy Savers, Ltd. (IL)

( * ) Notice: Subject to any disclaimer, the term of this patent is extended or adjusted under 35 U.S.C. 154(b) by 0 days.

(21) Appl. No.: 09/503,587

(22) Filed: Feb. 14, 2000

(51) Int. Cl.[7] .................. F25D 31/00; A01G 25/00
(52) U.S. Cl. .................. 405/36; 405/51; 405/56; 47/1.01 F; 165/45; 62/260
(58) Field of Search .................. 405/36, 51, 56, 405/59, 130; 47/1.01 F; 165/45; 62/260

(56) References Cited

U.S. PATENT DOCUMENTS

| | | | | |
|---|---|---|---|---|
| 661,944 A | | 11/1900 | Belden .................. 62/289 |
| 1,442,367 A | * | 1/1923 | Stevens .................. 47/1.01 R |
| 3,498,077 A | | 3/1970 | Gerard et al. .................. 62/260 |
| 3,675,442 A | | 7/1972 | Swanson .................. 62/285 |
| 3,890,740 A | * | 6/1975 | Miller .................. 47/1.01 R |
| 4,065,926 A | * | 1/1978 | Brandt .................. 405/36 |
| 4,348,135 A | * | 9/1982 | St. Clair .................. 405/36 |
| 4,351,651 A | * | 9/1982 | Courneya .................. 165/111 |
| 4,459,177 A | | 7/1984 | O'Hare .................. 203/10 |
| 4,577,435 A | * | 3/1986 | Springer et al. .................. 47/2 |
| 5,368,092 A | * | 11/1994 | Rearden et al. .................. 164/45 |
| 6,148,559 A | * | 11/2000 | May .................. 47/1.01 F |

FOREIGN PATENT DOCUMENTS

| | | | | |
|---|---|---|---|---|
| WO | WO 98/33372 | * | 8/1998 | .......... A01G/25/00 |

* cited by examiner

Primary Examiner—Thomas B. Will
Assistant Examiner—Tara L. Mayo
(74) Attorney, Agent, or Firm—Robert M. Gamson; Leonard Bloom

(57) ABSTRACT

An irrigation system comprising an energized cooling system for cooling the fluid to a temperature below ground temperature, colosed-loop condensation piping buried under ground surface and an energized fluid circulating arrangement for circulating the fluid through the system, whereby propelling the cooled fluid through the piping extracts moisture from the ground by condensation over the piping, for consumption by agriculture growth in the vicinity of the piping.

17 Claims, 3 Drawing Sheets

UNDERGROUND IRRIGATION METHOD AND SYSTEM

FIELD OF THE INVENTION

The present invention is generally in the field of irrigation and more specifically it is concerned with a method and system for irrigation by condensation.

BACKGROUND OF THE INVENTION

There is always a demand for fresh irrigation of water and there occurs particular problems in remote country areas which lack sufficient resources of fresh water and where supply and water by pipes is costly owing to extreme distances requiring substantially long pipes and power supplies for pumping stations etc.

Various solutions are provided for that purpose, such as desalination of sea water, capturing flood water, exploiting underground aquifers etc. However, these methods of supplying irrigation water have one or more of several drawbacks such as providing water at poor quality not suitable for agriculture, high cost and low efficiency high wear of equipment, dependency upon precipitation, etc.

Other arrangements provide recovering moisture from air masses, typically by various condensation methods. These arrangements are usually highly costly and of questionable efficiency. Some particular examples provide limited solutions adjacent coastal zones wherein deep ocean water at significantly low temperature may be pumped for recovering of fresh water by condensation.

Some of the prior art patents concerning recovering of fresh water from the moist in the air are the following U.S. patent: U.S. Pat Nos. 661,944, 3,498,077, 3,675,442 and 4,459,177.

It is an object of the present invention to provide an underground irrigation system for recovering water from moisture contained in the soil by condensation pipes buried in the soil at a depth corresponding with depths of roots of agriculture growth. The term underground is used to denote that the piping is received within any media suitable for agriculture growth, wherein the pipes are received within said media. In case of an artificial soil bedding this term may be understood also as in-ground, depending on the context. Herein the specification and claims, the terms ground and sod are interchangeably used to denote the growing media.

SUMMARY OF THE INVENTION

According to a first aspect of the present invention there is provided an irrigation system comprising an energized cooling system for cooling the fluid to a temperature below ground temperature, closed-loop condensation piping buried under ground surface and an energized fluid, circulating arrangement for circulating the fluid through the system, whereby propelling the cooled fluid through the piping extracts moisture from the ground by condensation over the piping, for consumption by agriculture growth in the vicinity of the piping.

The term closed-loop denoted a system wherein substantially there is no loss of fluid. Typically, the fluid is a liquid such as water and there is provided a liquid reservoir.

In order to increase overall thermal efficiency, one or more components of the system are buried under ground for reducing heat loss during hot hours of the day. In some cases it might be advantageous to provide additional cooling systems for increasing performances of the system.

Typically, die cooling system includes beat exchanger arrangements for cooling the fluid.

The system can be a so-called stand alone irrigation system, or it may be used as a co-existing system along with a conventional irrigation system, where each of the systems may be selectively used.

The fluid circulating arrangement and the cooling system may be energized by a variety of energy sources such as, solar energy supply, wind energy, electric energy (main supply, generators, etc,), hydraulic energy, biomass energy and source of natural cold water.

In order to increase the amount of liquid recovered by condensation, it is preferred to form the piping with increased section area. This is possible by forming the piping with indentations or serrated sheath surface, increasing the effective surface of the piping which is in contact with the ground.

Typically, a control system is provided for retaining a substantially constant $\Delta T$ by regulating fluid temperature, where:

$$\Delta T = T_g - T_f$$

$T_g$ = ground temperature measure at the vicinity of the piping;

$T_f$ = fluid temperature running through the piping, and where $T_f > 0$.

The control system is utilized also for governing flow parameters and operative patterns of the irrigation system, e.g. sensing the humidity of the soil at different hours of the day in order to recover maximum condensation liquid, determining hours of the day during which the fluids in the system is at its minimal temperature, etc.

In accordance with a second aspect of the present invention there is provided a method for underground irrigation according to which a fluid is propelled at a temperature below ground temperature, through a closed piping system buried below ground surface, thereby condensing liquid over the piping sheath for consumption by agriculture growth in the vicinity of the piping.

In accordance with the irrigation method of the invention, the piping is connected to a fluid reservoir, a circulating arrangement and a cooling system for chilling the fluid.

BRIEF DESCRIPTION OF THE DRAWINGS

For better understanding the invention and to exemplify how it may be carried out in practice, the invention will now be described with reference to the accompanying drawings in which.

DETAILED DESCRIPTION OF SPECIFIC EMBODIMENTS

Figure 1:
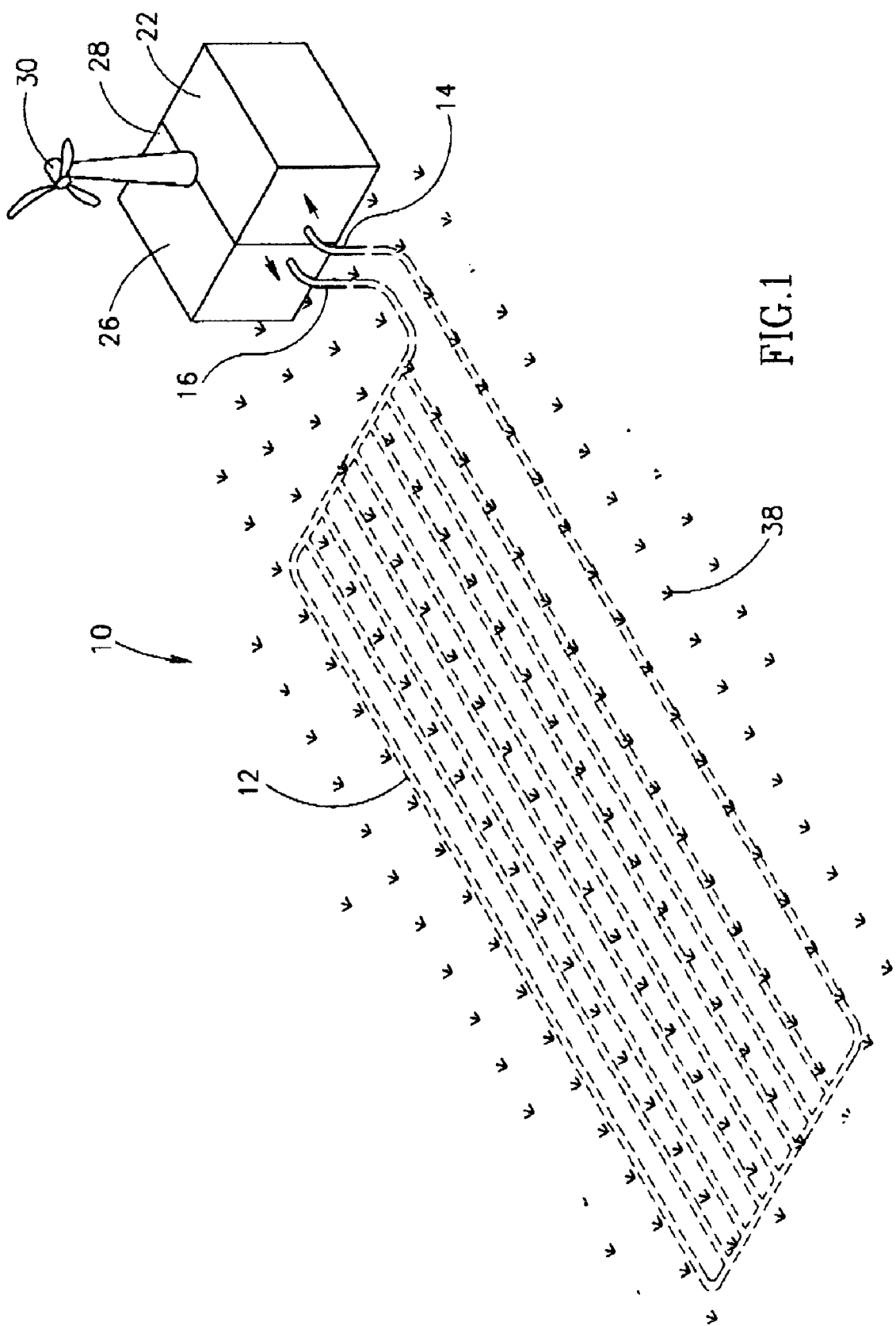
FIG. 1 is a schematic illustration of a first embodiment of the invention.

Attention is first directed to FIG. 1 of the drawings illustrating the irrigating system generally designated 10 wherein a closed loop of piping 12 is buried under ground surface, e.g. at a depth of between about 5 to 20 cm, with an inlet end 14 and an outlet end 16. However, the actual depth of the piping should correspond with the depth of roots of a respective agriculture growth. As already mentioned above, the ground may also be a soil bedding of any type wherein the piping is received within the bedding.

Inlet 14 is connected to a cooling system 22 whilst outlet 16 is connected to a circulating pumping arrangement 26. In the present example cooling system 22 and pumping system 26 are received in a common housing 28 with a wind-operated electric supply system generally designated at 30 energizing both the cooling system 22 and the circulating pump 26. It will be however appreciated that each of cooling system 22 and circulating pump 26 may be located at any location of the plant with a common energizing system in accordance with the present example or separate ones.

Figure 3A:
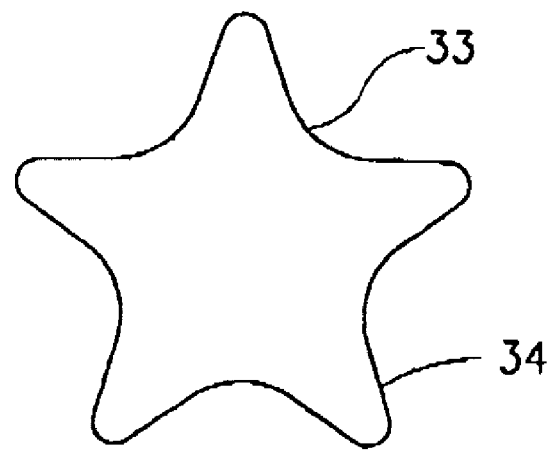
FIGS. 3A and 3B are cross-sections of different embodiments of a pipe for use with a system according to the invention.
Figure 3B:
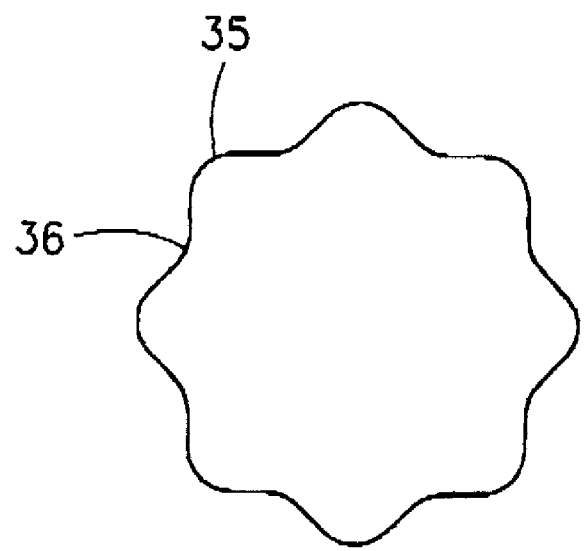

The piping 12 may be made of simple plastic or any other material which provides increased condensation thereabout as known per se. Typically, the piping is buried at a depth which corresponds to the root depth of a specific growth planted in the site, In order to improve condensation, the area of contact of the piping with the soil may be increased by providing piping 33 with increased sheath area having a cross-sectional shape formed with a plurality of axial projections 34 (FIG. 3A) or a piping 35 formed plurality of axial indentations 36 (FIG. 3B).

When fluid, typically a liquid such as water, is cooled in the cooling system 22 and is then circulated through piping 12 by means of circulating pump 26 (if required several circulating pumps may be fitted in the system), thermal gradient develops between the soil and the sheath of the piping 42, resulting in condensation induced around the piping, whereby the humidity of the soil in the vicinity of the piping is converted into liquid available for consumption by the roots of the plants 38.

It is known that cold water agriculture yields crops having rapid growth, high yield with high sugar and aromatic content of the fruits and vegetables.

Figure 2:
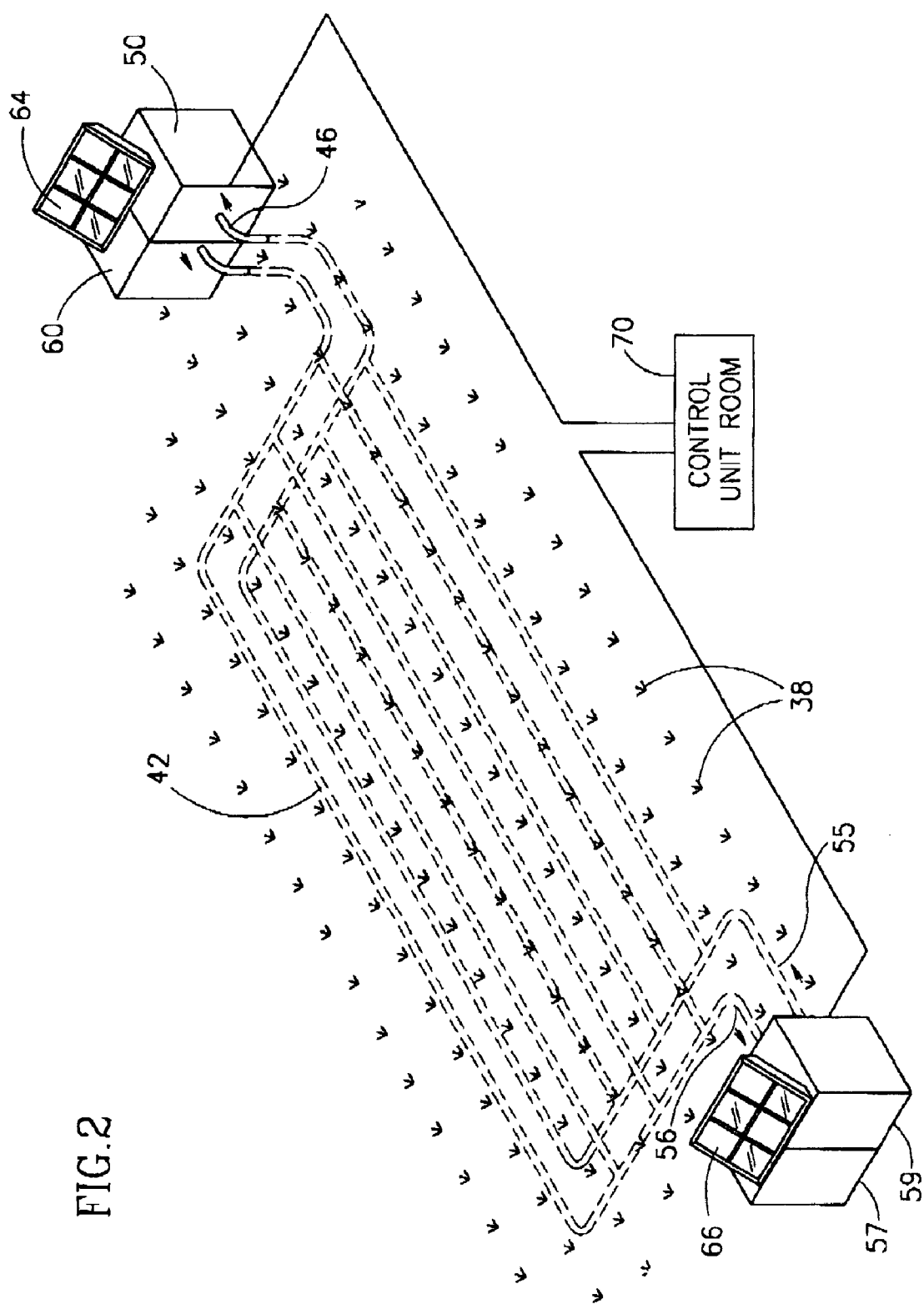
FIG. 2 is a schematic illustration of another embodiment of an invention in accordance with the present invention.

Further attention is now directed to FIG. 2 illustrating a modification of the previous embodiment wherein the piping 42 is buried under ground level, as in accordance with the previous embodiment, wherein the piping 42 is connected at a first inlet 46 to a first cooling system 50 with a second inlet 55 and outlet 56 connected to a second cooling system 57 positioned at a remote end of the irrigated field or at any suitable location, thereby obtaining improved thermal efficiency of the system. A pumping unit 60 is incorporated in the same housing as the first cooling system 50 whereby solar panels 64 and 66 supply the required electric power for energizing the cooling systems and the circulating pump, respectively.

Further seen in the embodiment of FIG. 2 there is a control unit generally designated 70 which is schematically represented and which comprises a variety of control means receiving different inputs such as fluid temperature within piping 42, inlet and outlet temperature at the cooling systems 50 and 54, soil temperature in the vicinity of the piping, relative humidity in the soil, precipitation (rain, dew, etc.) According to the data received the control unit 70 emits operating signals to operate or cease operation of the system, pumping rate, temperature of fluid at the cooling system outlet, etc.

While preferred embodiments of the invention have been exemplified, it should be clear that it is not intended thereby to limit the disclosure of the invention, but rather it is intended to cover all modifications and arrangements falling within the scope and spirit of the present invention, mutatis mutandis.

For example, different layout of cooling system and pumping units may be set up, depending on topographic conditions, etc. Furthermore, the energizing power for a system in accordance with the present invention may be any suitable system such as, for example, solar, wind, electric, hydraulic, biomass, etc.

What is claimed is:

1. An irrigation system for agricultural growth having a liquid circulating therein, comprising an energized cooling system for cooling the liquid to a temperature below ground temperature, closed-loop condensation piping buried under the ground surface and in the vicinity of the agricultural growth, and an energized liquid circulating arrangement for circulating the liquid through the system, whereby propelling the cooled liquid through the piping extracts moisture from the ground by condensation over the piping for consumption by the agriculture growth in the vicinity of the piping.

2. An irrigation system according to claim 1, wherein a liquid reservoir is provided.

3. An irrigation system according to claim 2, wherein at least the liquid reservoir is placed under ground.

4. An irrigation system according to claim 1, wherein the cooling system includes at least one heat exchanger.

5. An irrigation system according to claim 1, wherein one or both of the liquid circulating arrangement and the cooling system are energized by an energy extracted from at least one of the following: solar, wind, electric, hydraulic and biomass energy source.

6. An irrigation system according to claim 1, wherein the piping is circular and has a sheath thereon, the sheath having a surface area greater than that of the circular piping, thereby increasing the amount of liquid condensed thereon.

7. An irrigation system according to claim 6, wherein the sheath on the piping has an indented or serrated surface.

8. An irrigation system according to claim 1, wherein a control system is provided for retaining a substantially constant change in temperature $\Delta T$ by regulating liquid temperature, where:

$$\Delta T = T_g - T_f$$

$T_g$ = ground temperature measured at the vicinity of the piping;

$T_f$ = liquid temperature running through the piping, and where $T_f > 0$.

9. An irrigation system according to claim 8, wherein the control system governs flow parameters and operative patterns of the irrigation system.

10. An irrigation system according to claim 1, wherein the energized cooling system comprises one or more cooling units.

11. A method of underground irrigation for agricultural growth according to which a liquid is propelled at a temperature below ground temperature, through a closed piping system buried below ground surface and in the vinicity of the agricultural growth thereby condensing liquid over the closed piping system for consumption by the agriculture growth in the vicinity of the piping.

12. An irrigation method according to claim 11, wherein the closed piping system is connected to a reservoir, a circulating arrangement and a cooling system for chilling the liquid.

13. An irrigation method according to claim 11, wherein a sheath is provided for the piping; thereby increasing the amount of liquid condensed thereon.

14. An irrigation system according to claim 11, wherein a control system is provided for retaining a substantially constant change in temperature $\Delta T$ by regulating fluid temperature, where:

$$\Delta T = T_g - T_f$$

$T_g$ = ground temperature measure at the vicinity of the piping;

$T_f$ = fluid temperature ruing through the piping, and where $T_f > 0$.

15. An irrigation system for agricultural growth having roots disposed at a given depth in the soil, comprising pipes buried in the soil at approximately the given depth of the roots of the agricultural growth, the pipes having a liquid circulating therein at a temperature which is less than the soil temperature at the vicinity of the pipes, such that moisture is drawn out of the soil and forms condensation on the pipes, thereby irrigating the soil at the given depth of the roots of the agricultural growth, and control means for providing a substantially constant difference between the soil temperature at the vicinity of the pipes and the temperature of the liquid running through the pipes.

16. A method of irrigating agricultural growth, wherein the agricultural growth has roots buried at a given depth, and wherein the soil adjacent to the roots is at a given temperature, comprising the steps of providing pipes and burying the pipes at approximately the given depth of the roots, and circulating a liquid through the pipes at a temperature which is less than the given temperature of the soil adjacent to the roots, thereby drawing moisture out of the soil and forming condensation on the pipes, and thereby irrigating the roots of the agricultural growth.

17. The method of claim 16, further including the step of providing a control means to maintain a substantially constant difference between the temperature of the soil in the vicinity of the pipes and the temperature of the fluid in the pipes.

* * * * *